March 11, 1941.    C. MACBETH    2,234,443
CLUTCH
Filed Oct. 24, 1939    3 Sheets-Sheet 1
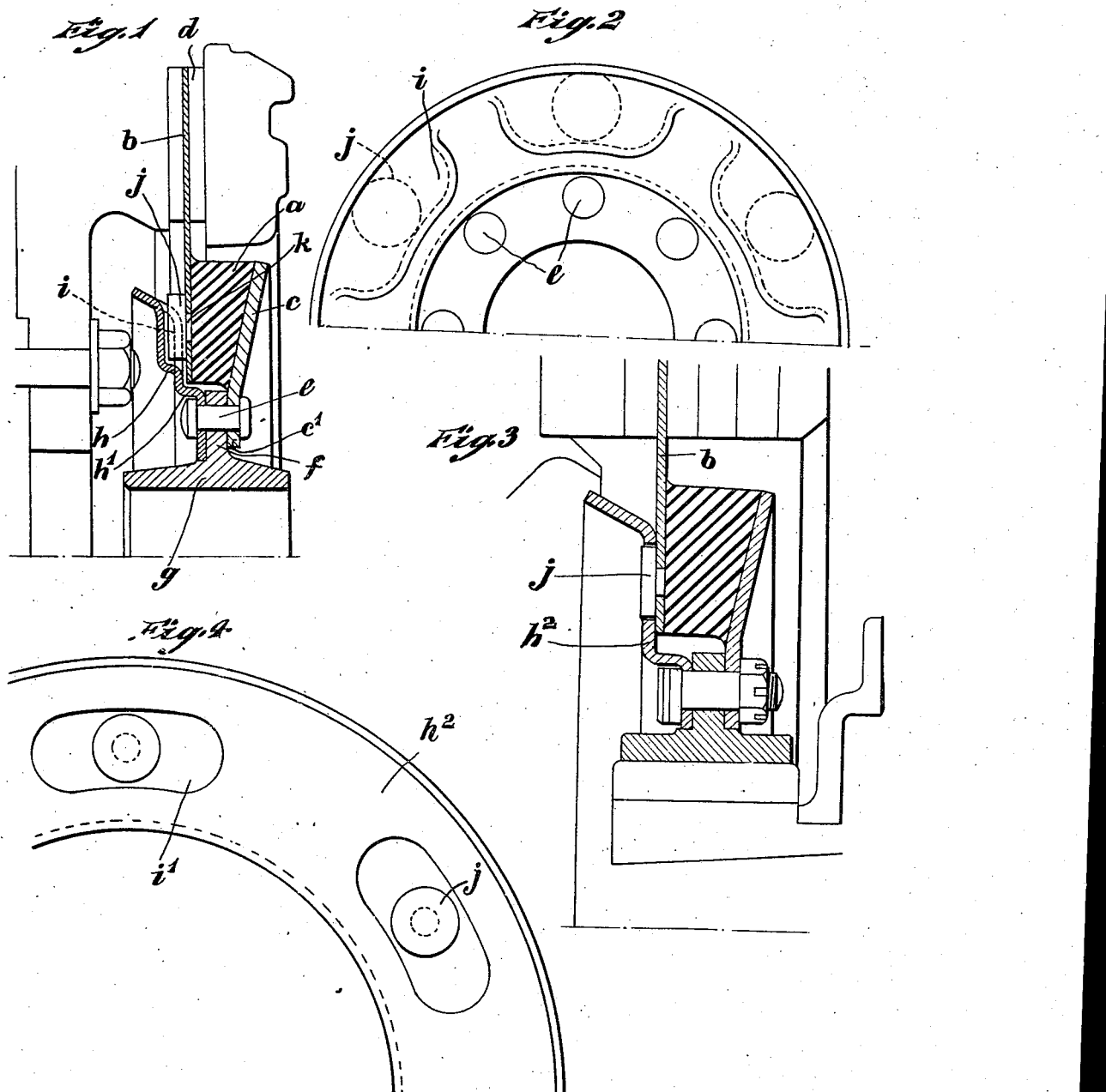
Inventor
Colin Macbeth
By Nathaniel Frucht
Attorney March 11, 1941.  C. MACBETH  2,234,443
CLUTCH
Filed Oct. 24, 1939  3 Sheets-Sheet 2
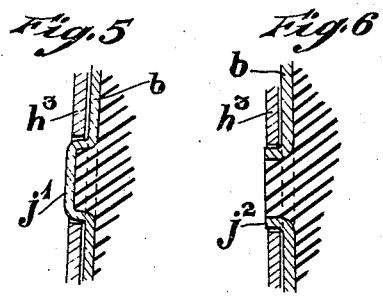
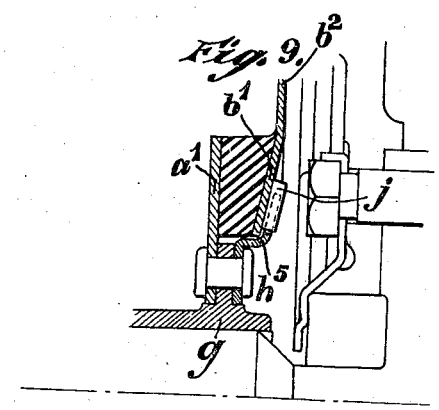
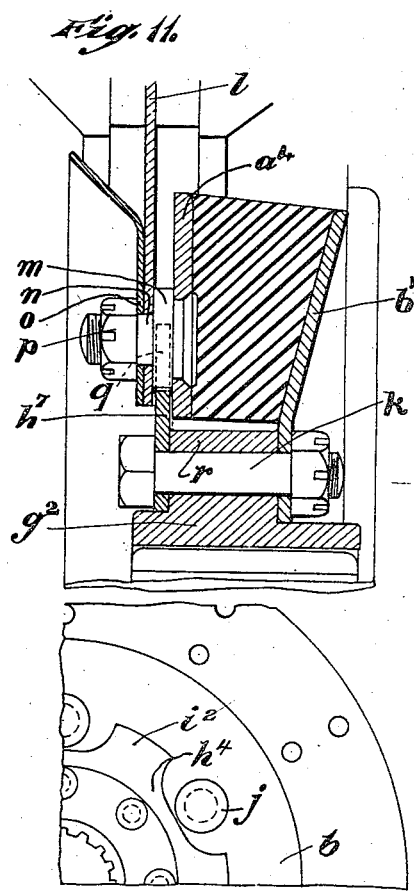
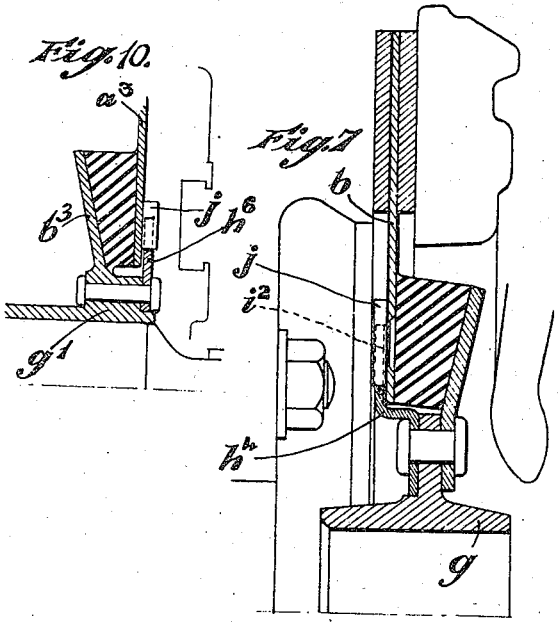
Inventor
Colin Macbeth
By Nathaniel Frucht
Attorney March 11, 1941. C. MACBETH 2,234,443
CLUTCH
Filed Oct. 24, 1939 3 Sheets-Sheet 3
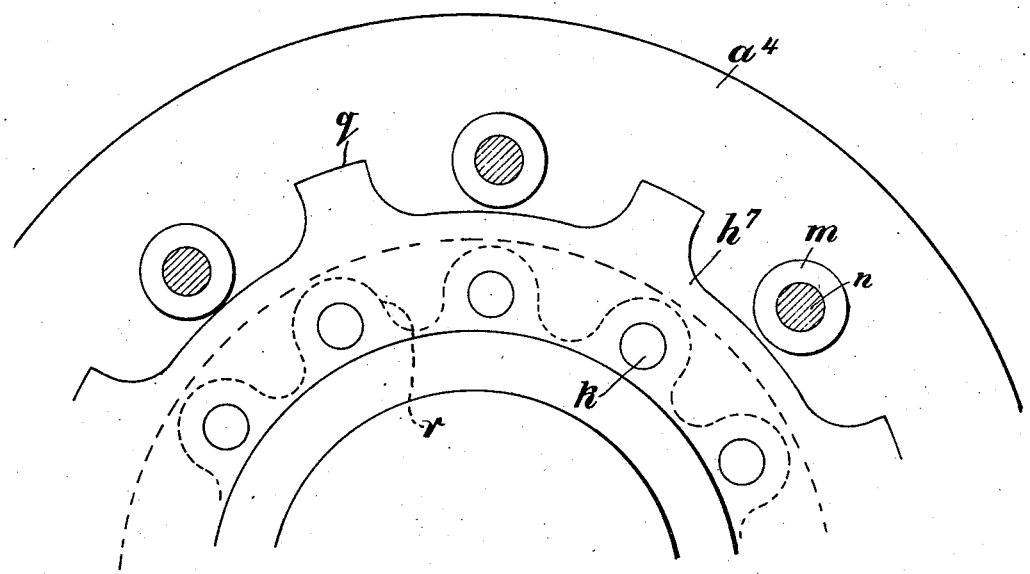
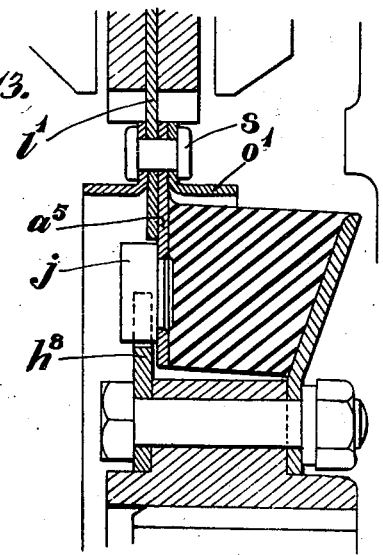
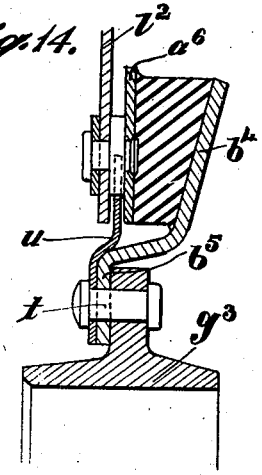
Inventor
Colin Macbeth
By Nathaniel Fruckt
Attorney Patented Mar. 11, 1941

2,234,443

UNITED STATES PATENT OFFICE 2,234,443

CLUTCH

Colin Macbeth, Birmingham, England

Application October 24, 1939, Serial No. 300,959
In Great Britain October 21, 1938

11 Claims. (Cl. 192—68)

This invention relates to improvements in and connected with clutches, and is particularly concerned with clutches comprising a rubber annulus of cuneiform or similar section bonded on each side to metal plates, so that the drive is transmitted from one plate to the other through the rubber intermediary.

The principal object of the present invention is to provide an improved construction which will ensure a positive driving connection in the event of failure of the rubber, without necessitating any essential constructional modifications of its cuneiform or taper-like cross section, further objects of the invention being to adapt the arrangement for use with existing constructions of clutch centres and without requiring an increase in the axial space required for such existing constructions capable of dissipating heat and adapted for protecting the clutch centre against undesired contact with oil.

According to this invention, the driving bonded metal plate is provided on its surface, remote from the rubber, with formations adapted for engagement with an emergency driven plate rigid with the hub of the clutch for affording a positive drive in the event of failure of the rubber, such emergency driven plate being disposed so as to prevent axial displacement of the driving plate. The arrangement prevents any interference with the effective moulding and assembly of a continuous rubber annulus having the desired cuneiform or taper-like cross section, thereby enabling it to be of regular and uniformly divergent cross-section from its inner to its outer periphery. Thus the annulus is essentially loaded at the same rate throughout its structure when subjected to tangential or torque loadings.

The emergency driving means may be in the form of projections on the driving bonded plate, which may constitute the clutch plate, such projections being normally disposed midway, with clearance, between short elongated openings or peripheral depressions in the emergency driven plate. Thus, in the event of breakdown of the rubber, the projections are engaged with the ends of the openings, or with peripheral teeth on such plate in either direction of rotation for taking up the drive. The disposition of the emergency driven plate in engagement with the surface of the driving plate remote from the driven bonded plate, prevents any axial displacement of the parts which might otherwise impair the emergency drive. The emergency driving plate may serve as an oil flinger disc and may be adapted to act as a guard to prevent oil from being thrown on to the clutch plate.

The driven bonded metal plate may be formed with an annular part extending inwardly of the rubber block and adapted for attachment to the flange of existing clutch centres, the flange being in the usual or approximately the usual axial position and, therefore, clear of the clutch-disengaging fingers, the other rubber-bonded plate being adapted for attachment to a clutch disc or plate. The improved arrangement enables the rubber block to be bonded to the associated metal plates and the assemblage to be supplied as a unit for attachment to clutch hubs of existing construction and to clutch discs of conventional type.

The improvements also provide a compact construction occupying a minimum axial space thereby avoiding interference with associated clutch parts. The bonded plate for connection to a relatively thin flexible clutch plate may be of thicker gauge metal than is desirable for flexible clutch plates, and may be separated by thick washers or the like from the flexible clutch plate thereby enabling air to exercise favourable heat dissipating effects which serve to safeguard the rubber from the high temperature set up due to clutch slip. The provision of thick separating washers enables an effective emergency drive to be provided between the bonded plate and the clutch centre or hub.

In order to enable the invention to be readily understood, reference will now be made to the accompanying drawings, illustrating by way of example, different examples of construction for carrying the invention into effect, in which drawings:

Figure 1 is a sectional elevation of part of one construction in accordance with the invention.

Figure 2 is an end elevation of the oil flinger disc, Figure 1.

Figure 3 is a view similar to Figure 1 of a modified construction.

Figure 4 is a fragmentary end elevation of a part of Figure 3.

Figures 5 and 6 are sections of modified arrangements for obtaining the emergency drive.

Figures 7, 9, 10, and 11 are sectional elevations of parts of further modified constructions of clutches, Figure 8 being an end view looking from the left side of Fig. 7.

Figure 12 is an end elevation of a part of Figure 10.

Figures 13 and 14 are sectional elevations of still further modified constructions.

Referring to Figures 1 and 2 of the drawings; the rubber annulus $a$ is of somewhat wedge or cuneiform shape in cross-section, its portion of maximum thickness being disposed at the outer circumference. The rubber is sandwiched between, and vulcanized to, two metal plates $b$ $c$. The flat side of the rubber is attached to the flat metal clutch plate $b$ of larger diameter than that of the rubber, the portion beyond the latter having frictional gripping rings $d$ attached thereto. The inclined surface of the rubber is attached to the other plate $c$ having an inwardly projecting flange $c^1$ which is secured by rivets $e$ around its central opening to one side of a circumferential flange $f$ on a hub $g$ which is splined to a shaft. An oil flinger disc $h$ is secured, by means of the rivets $e$, to the other side of this flange $f$ so as to extend over the inner part of the clutch plate $b$. The latter and the flinger disc $h$ are formed with co-operating elements which are adapted to constitute a positive metal-to-metal connection for driving in an emergency in the event of failure of the rubber. Thus, radially disposed surfaces $i$ on the disc $h$ are adapted for driving engagement with cylindrical surface projections $j$, having their shanks $k$ riveted or welded on the clutch plate $b$ so as to project laterally from the surface of the latter, remote from the rubber.

It will be understood that the projections on the flat metal plate $b$ extend outwardly and laterally therefrom, so that there is no undesirable interference with the cross-sectional shape of the rubber by removal of portions of the latter. The oil flinger disc $h$ may be formed with a series of annular steps $h^1$ adapted for preventing oil from being thrown centrifugally from the hub spline on to the clutch plate friction members $d$.

As will be seen from Figure 2, a pair of radial ribs or surfaces $i$ is disposed on each side of a projection $j$ on the hub plate $b$ and are spaced a short distance on either side thereof. Each projection is normally disposed midway between a pair of ribs $i$. In the event of failure of the rubber $a$, the relative circumferential movement between the plates $b$ and $c$ and $h$ enable these parts to be engaged for transmitting a metal-to-metal drive in either direction.

In the modified construction, Figure 3 and Figure 4, the projections $j$ on the clutch plate $b$ enter short arcuate holes $i^1$ in the disc $h^2$. The projections normally disposed midway of these openings, engage with the ends of the latter to provide the emergency drive, if the rubber should fail.

As shown in Figure 5, countersunk cheese head projections $j^1$ may be pressed out of the clutch plate $b$, or annular flanges $j^2$, Figure 6, may be plunged and pierced in such plate for establishing emergency driving engagement with openings in a plate $h^3$ rigid with the hub of the clutch.

In the modified construction shown in Figures 7 and 8, the periphery of the disc $h^4$ is formed with teeth $i^2$ into the spaces between which extend, with clearance, the projections $j$ on the clutch plate $b$, these parts being engaged for transmitting the drive if the rubber should fail, as previously described.

As shown in Figure 9, the coned plate $b^1$ of the unit, is formed with a flat outer part $b^2$ constituting the clutch plate, while the flat plate $a^1$ is riveted to the hub $g$. The coned portion $b^1$ is provided with cylindrical projections $j$ disposed midway in the spaces of the toothed periphery of a disc or plate $h^5$ riveted to the hub $g$ as in Figure 7.

In Figure 10, the metal plate $b^3$ bonded to the sloping surface of the rubber block, is integral with the hub $g^1$. The other metal plate $a^3$ is thin and flexible to constitute the clutch plate and is provided with lateral projections $j$ extending midway into the spaces of a peripherally toothed flat disc $h^6$ riveted to the hub.

According to the modification illustrated in Figures 11 and 12, the peripherally toothed flat disc $h^7$, secured by bolts $k$ which serve for the attachment of the sloping plate $b^4$ to the hub $g^2$, is disposed between the flat plate $a^4$ of the unit and a clutch plate $l$. The latter is spaced from the plate $a^4$ by enlargements or collars $m$ on the emergency driving studs $n$ on the plate $a^4$. The clutch plate $l$, together with a peripherally flanged deflector or guard disc $o$ is secured on these studs by nuts $p$. As seen in Figure 12, the emergency driving studs are disposed midway between the teeth $q$ on the disc $h^7$ for the purpose previously described. The bolts $k$ may extend through boss-like formations $r$ on the hub. The spacing devices $m$ provide, between the clutch plate and the bonded plate $a^4$, air spaces which enable heat to be dissipated before any transference, disadvantageous to the rubber, can occur between such plates. In addition, the shield or deflector $o$ helps to dissipate heat from the clutch plate. For preventing or minimizing the conduction of heat from the clutch plate, heat-insulating means made of asbestos for example, may also be provided at suitable points.

Referring to Figure 13, the clutch plate $l^1$ is secured to the outer part of the bonded plate $a^5$ by rivets $s$ which serve also for securing shaped deflectors or shields $o^1$ on each side of the clutch plate for preventing or minimizing the transmission of heat from the latter. The emergency drive is provided by the peripherally toothed disc $h^8$ and studs or projections $j$ on the bonded plate $a^5$ as previously described. The disc $h^8$ may be in one piece with the hub itself.

Referring to Figure 14, the sloping driven plate $b^4$ is bent inwardly to provide a flange $b^5$ secured to the hub $g^3$, by means of rivets $t$ which also secure a peripherally toothed disc $u$ with its toothed formations disposed between the clutch plate $l^2$ and the flat bonded plate $a^6$. Such toothed formations are arranged for emergency driving engagement with studs on the plate $a^6$ as described with reference to Figure 11. This construction enables the hub to be in its normal axial position as used with a clutch plate bolted to the forward face of the hub, and enables the flat bonded driven plate $a^6$ and the emergency plate riveted thereto, to be handled as a unit when being attached to the hub.

Having described my invention what I claim and desire to secure by Letters Patent is:

1. A clutch comprising a hub, a rubber annulus bonded on each side to metal plates one of which is connected to said hub, while the other is arranged for transmitting the drive, an emergency driven plate rigid with said hub and adapted for engagement with formations on the surface remote from the rubber, of the metal driving plate.

2. A clutch comprising a hub, a rubber annulus bonded on each side to metal plates one of which is connected to said hub, while the other is arranged for transmitting the drive, an emergency driven plate rigid with said hub, disposed so as to prevent axial displacement of the metal driving plate, and adapted for rotational engagement with formations on the surface, remote from the rubber, of said driving plate.

3. A clutch comprising a hub having a flange, a rubber annulus of wedge-like section bonded on each side to metal plates, one of which is rigid with the flange and constitutes the driven plate, while the other plate is arranged for transmitting the drive, an emergency driven plate rigid with said flange, disposed so as to prevent axial displacement of the metal driving plate and adapted for rotational engagement with formations on the surface, remote from the rubber, of said driving plate.

4. A clutch comprising a hub having a circumferential flange, a rubber annulus of wedge-like section bonded on each side to metal plates one of which is rigidly secured to one side of said flange and constitutes the driven plate, while the other is arranged for transmitting the drive, an emergency driven plate secured to the other side of said flange so as to extend over the outer face of the metal driving plate and co-operative elements on said emergency driven plate and the driving plate adapted to come into engagement for effecting a positive metal-to-metal connection for driving in an emergency in the event of failure of the rubber.

5. A clutch comprising a hub having a circumferential flange, a rubber annulus of wedge-like section bonded on each side to metal plates one of which is rigidly secured to the flange and constitutes the driven plate while the other is arranged for transmitting the drive, an emergency driven plate secured to said plate, projections on the outer face of the metal driving plate and adapted for establishing an emergency metal-to-metal drive with the emergency driven plate in the event of failure of the rubber.

6. A clutch comprising a hub, a rubber annulus bonded on each side to metal plates one of which is connected to said hub while the other is arranged for transmitting the drive and is formed with projections extending outwardly and laterally therefrom on its surface remote from the rubber, and an emergency driven plate rigidly secured to said hub having formations adapted for co-operating with said projections to constitute an emergency metal-to-metal driving connection therewith in the event of failure of the rubber.

7. A clutch comprising a hub, a rubber annulus bonded on each side to metal plates, one of which is connected to said hub and constitutes the driven plate, while the other is arranged for transmitting the drive and is formed with projections extending outwardly and laterally therefrom on its surface remote from the rubber, and an emergency driven plate rigidly secured to said hub and formed with openings in each of which one of said projections is disposed with clearance.

8. A clutch comprising a hub, having a circumferential flange, a rubber annulus of wedge-like section bonded on each side to metal plates, one of which constitutes a driving clutch plate and is formed with projections extending laterally therefrom on the surface remote from the rubber, while the other is formed with an inwardly directed flange for attachment to one side of the flange on the hub, and an emergency driven plate attached to the other side of the flange on the hub and formed with short elongated openings in each of which is disposed with clearance one of the projections on the driving plate.

9. A clutch comprising a hub having a circumferential flange, a rubber annulus of wedge-like section bonded on each side to metal plates, one of which constitutes a driving plate and is formed with projections extending laterally therefrom on the surface remote from the rubber, while the other is formed with an inwardly directed flange for attachment to one side of the flange on the hub, and an emergency driven plate having a radial surface disposed on each side of each projection and spaced a short distance on either side thereof.

10. A clutch comprising a hub, a rubber annulus of wedge-like section bonded on each side to metal plates, one of which constitutes a driving plate and is formed with emergency driving formations on its surface remote from the rubber, while the other is adapted for attachment to the hub for transmitting the drive, a clutch plate, spaced from the driving plate by said formations, and an emergency driven plate formed with peripheral teeth adapted for engagement with said formations in the event of failure of the rubber.

11. A clutch comprising a hub, a rubber annulus of wedge-like section bonded on each side to metal plates, one of which constitutes a driving plate and is formed with emergency driving formations on its surface remote from the rubber, while the other is adapted for attachment to the hub for transmitting the drive, a clutch plate in driving engagement with the driving plate, an emergency driven plate attached to the hub and formed with radial surfaces for engagement with said formations in the event of failure of the rubber, and a deflector shield secured to said clutch plate.

COLIN MACBETH.